US012301086B2

(12) United States Patent
Kang et al.

(10) Patent No.: US 12,301,086 B2
(45) Date of Patent: May 13, 2025

(54) MAGNETIC LEVITATION ROTOR SAIL

(71) Applicant: Korea Institute of Ocean Science & Technology, Busan (KR)

(72) Inventors: Hee Jin Kang, Gyeryong-si (KR); Yunho Kim, Daejeon (KR)

(73) Assignee: Korea Institute of Ocean Science & Technology, Busan (KR)

( * ) Notice: Subject to any disclaimer, the term of this patent is extended or adjusted under 35 U.S.C. 154(b) by 330 days.

(21) Appl. No.: 17/816,822

(22) Filed: Aug. 2, 2022

(65) Prior Publication Data

US 2023/0378848 A1    Nov. 23, 2023

(30) Foreign Application Priority Data

May 23, 2022   (KR) .......................... 10-2022-0063014

(51) Int. Cl.
*H02K 7/09* (2006.01)
*B63H 9/02* (2006.01)

(52) U.S. Cl.
CPC ............... *H02K 7/09* (2013.01); *B63H 9/02* (2013.01)

(58) Field of Classification Search
CPC ............. F16C 32/0417; F16C 32/0446; F16C 32/0474; B63H 9/02; H02K 7/09; H02N 15/00
USPC ........................................................ 310/90.5
See application file for complete search history.

(56) References Cited

U.S. PATENT DOCUMENTS

| 11,703,085 | B2* | 7/2023 | Sakawaki | ............. F04D 29/048 |
| | | | | 417/63 |
| 11,751,330 | B2* | 9/2023 | Milheim | ................. H02K 1/02 |
| | | | | 174/257 |
| 11,752,247 | B2* | 9/2023 | Fini | ..................... A61M 1/1625 |
| | | | | 210/645 |
| 11,808,279 | B1* | 11/2023 | Okada | ................... F16C 32/044 |
| 11,821,078 | B2* | 11/2023 | Kuwano | .......... H01L 21/02274 |
| 11,859,618 | B2* | 1/2024 | Lawyer | ................. F04D 29/588 |
| 12,034,350 | B2* | 7/2024 | Jungmayr | ............. H02K 7/083 |
| 12,097,940 | B2* | 9/2024 | Kang | ...................... B64U 30/26 |
| 12,125,700 | B2* | 10/2024 | Utsuno | ................... C23C 16/50 |
| 12,149,134 | B2* | 11/2024 | Bartlett | ................. H02K 1/246 |
| 2013/0243592 | A1* | 9/2013 | Rohden | .................... B63H 9/02 |
| | | | | 416/4 |
| 2024/0283340 | A1* | 8/2024 | Barreiro | .............. H02K 16/005 |

(Continued)

FOREIGN PATENT DOCUMENTS

| CN | 112208347 A | * | 1/2021 | ............. B60L 13/04 |
| KR | 10-895899 B1 | | 5/2009 | |
| KR | 10-2014-0024469 A | | 2/2014 | |

(Continued)

OTHER PUBLICATIONS

CN-112208347-A (translation) (Year: 2021).*

*Primary Examiner* — Rashad H Johnson
(74) *Attorney, Agent, or Firm* — Knobb, Martens, Olson, & Bear, LLP

(57) ABSTRACT

A magnetic levitation rotor sail is proposed. The rotor sail may include a coil unit provided at a lower portion of a body of the rotor sail, and an electromagnet configured to levitate the coil unit. The rotor sail may also include a support member supporting the electromagnet, and a gap sensor provided at the support member and configured to measure a gap between the coil unit and the electromagnet.

6 Claims, 3 Drawing Sheets

(56) References Cited

U.S. PATENT DOCUMENTS

2024/0400233 A1* 12/2024 Boyer .................... B64G 1/244

FOREIGN PATENT DOCUMENTS

| KR | 10-2015-0008138 A | 1/2015 |
| KR | 10-1488839 B1 | 2/2015 |
| KR | 10-2019-0101773 A | 9/2019 |

* cited by examiner

MAGNETIC LEVITATION ROTOR SAIL

CROSS REFERENCE TO RELATED APPLICATION

The present application claims priority to Korean Patent Application No. 10-2022-0063014, filed May 23, 2022, the entire contents of which are incorporated herein for all purposes by this reference.

BACKGROUND

Technical Field

The present disclosure relates to a magnetic levitation rotor sail. More particularly, the present disclosure relates to a magnetic levitation rotor sail capable of rotating a rotor sail without a bearing.

Description of Related Technology

Recently, due to restrictions on emission of greenhouse gas of a ship, a technology of utilizing renewable energy such as a wind force is gaining attention as a technology for reducing the emission of greenhouse gas of a ship.

SUMMARY

One aspect is a magnetic levitation rotor sail magnetically levitating and rotating a rotor sail so that the rotor sail is capable of being rotated without a bearing that highly affects durability of the rotor sail, thereby being capable of increasing a rotation speed of the rotor sail.

Another aspect is a magnetic levitation rotor sail, the rotor sail including: a coil unit provided at a lower portion of a body of the rotor sail; an electromagnet configured to levitate the coil unit; a support member supporting the electromagnet; and a gap sensor provided at the support member and configured to measure a gap between the coil unit and the electromagnet.

At least some embodiments can provide the magnetic levitation rotor sail having the coil unit provided at the lower portion of the body of the rotor sail, the magnetic levitation rotor sail having the electromagnet which is configured to levitate and rotate the coil unit and which is provided at the support member, so that the magnetic rotor sail can be magnetically levitated and rotated without a bearing.

DETAILED DESCRIPTION

Among the technology of utilizing renewable energy, a rotor sail is a technology that supports a thrust force of a ship by using a wind force, so that the thrust force to drive the ship can be supported. Therefore, the rotor sail is gaining attention since carbon emissions occurring when fossil fuels are used in the ship can be highly reduced. For example, there has been a Magnus rotor as disclosed in Korean Patent No. 10-1488839 and so on.

However, in the Magnus rotor, since a rotor and a support body are coupled to each other with a bearing, abrasion of the bearing occurs according to a rotation speed of the rotor, so that there are problems that durability of the Magnus rotor is lowered and periodic maintenance of the Magnus rotor is required.

Therefore, an apparatus capable of maintaining high durability when a rotation speed of a rotor sail is high and also capable of easily performing maintenance has been tried to be developed. However, satisfactory results have not been realized.

Hereinafter, the present disclosure will be described in detail with reference to the accompanying drawings.

Figure 1:
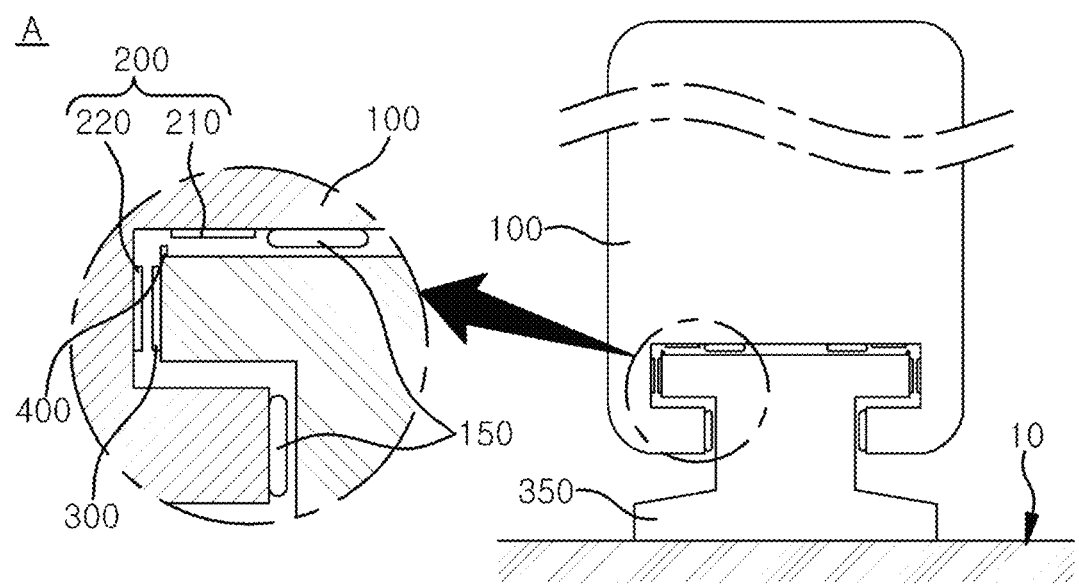
FIG. 1 is a schematic view illustrating an overall structure of a magnetic levitation rotor sail according to the present disclosure.

As illustrated in FIG. 1, a magnetic levitation rotor sail A according to the present disclosure includes: a body 100; a coil unit 200; an electromagnet 300; a support member 350; and a gap sensor 400.

By using the Magnus effect, the body 100 of the present disclosure is capable of obtaining a thrust force by being rotated by a wind force.

At this time, as an embodiment, the body 100 may have a hollow cylindrical shape.

Figure 2:
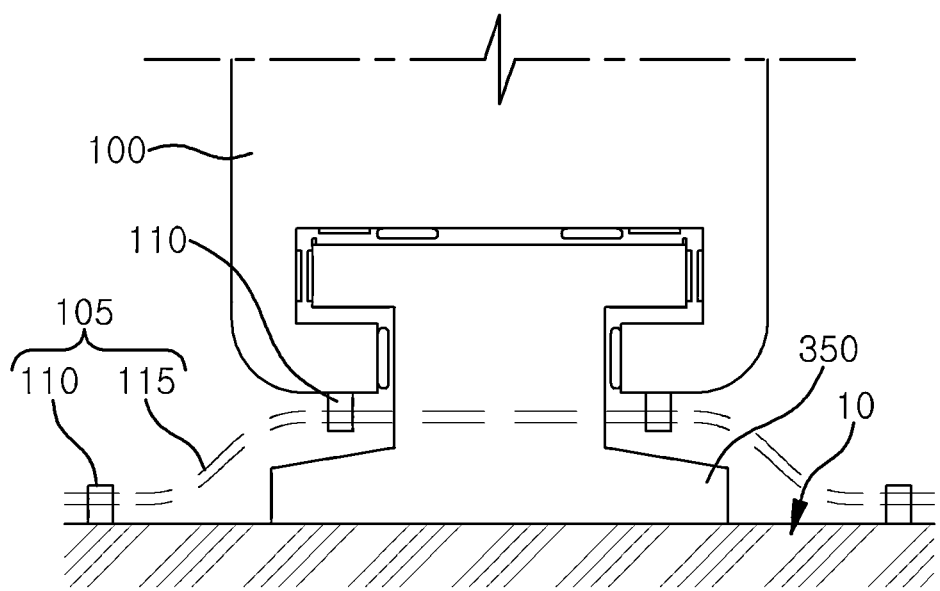
FIG. 2 is a detail view illustrating a locking means of the magnetic levitation rotor sail according to the present disclosure.

Here, as illustrated in FIG. 2, the body 100 is provided with a locking means or locking member 105, so that the body 100 is capable of being fixed to a hull 10 when the body 100 is required to be fixed.

At this time, as an embodiment, rings 110 are provided on the body 100 and the hull 10, so that the body 100 is capable of being fixed to the hull 10 by fastening a rope 115 to the rings 110.

The coil unit 200 of the present disclosure is provided at a lower portion of the body 100, and includes a levitation coil 210 and an electric coil 220.

The electromagnet 300 of the present disclosure may levitate the coil unit 200.

More specifically, the levitation coil 210 of the coil unit 200 is provided such that a vertical gap is formed between the levitation coil 210 and the electromagnet 300, and levitates the body 100 in a vertical direction. Further, the electric coil 220 is provided such that a horizontal gap is formed between the electric coil 220 and the electromagnet 300, so that the body 100 can be rotated.

At this time, as an embodiment, the levitation coil 210 may be a repulsive type levitation coil in which the levitation coil 210 has the same polarity as the electromagnet 300 and is levitated by using a repulsive force.

Figure 3:
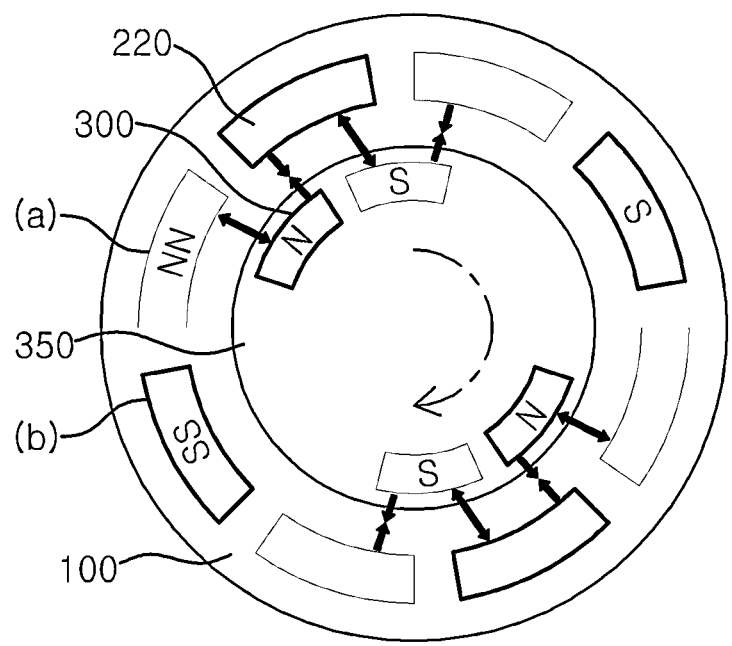
FIG. 3 is a detail view illustrating a rotation principle of the magnetic levitation rotor sail according to the present disclosure.

Here, as illustrated in FIG. 3, in the electromagnet 300 and the electric coil 220, when a wind force is transferred to the body 100, the electric coil 220 can be rotated by N poles (a) and S poles (b) of the electric coil 220 pushing N poles (a) and S poles (b) of the electromagnet 300.

At this time, the electromagnet 300 is capable of being magnetic when a power is applied to the electromagnet 300.

Here, as another embodiment, by controlling when the power is applied to the electromagnet 300, the levitation coil 210 may be an attraction type levitation coil in which the levitation coil 210 is levitated by using an attractive force which is generated by the levitation coil 210 having polarity opposite to the electromagnet 300 and which induces the levitation coil 210 to be adhered to the electromagnet 300.

At this time, the electromagnet 300 may be supported by being provided at the support member 350.

The gap sensor 400 of the present disclosure is provided at the support member 350, so that the gap sensor 400 is capable of measuring a gap between the coil unit 200 and the electromagnet 300.

Here, as an embodiment, the gap sensor 400 may measure a gap between the levitation coil 210 of the coil unit 200 and the electromagnet 300, and may be connected to a controller (not illustrated in drawings).

At this time, when the gap between the levitation coil 210 and the electromagnet 300 is reduced, the controller (not illustrated in drawings) may stop an operation of the electromagnet 300.

Here, as long as a controller can control the electromagnet 300, the controller (not illustrated in drawings) may be any conventional controller of any structure and any method, so that a detailed description of the controller (not illustrated in drawings) will be omitted.

In addition, buffer members 150 are provided at the lower portion of the body 100. Therefore, a collision between the body 100 and the support member 350, the collision occurring when a problem occurs in the levitation coil 210 and the electromagnet 300 and the gap is reduced, may be prevented.

The magnetic levitation rotor sail A according to the present disclosure will be described in detail.

The body 100 of the present disclosure is provided in a hollow cylindrical shape and is rotated by a wind force, so that the body 100 may obtain a thrust force by the Magnus effect.

At this time, since the body 100 is provided with the locking means 105, the body 100 may be fixed to the hull 10 when the body 100 is required to be fixed.

Here, the rings 110 are provided on the body 100 and the hull 10, so that the body 100 may be fixed by fastening the rope 115 to the rings 110.

The coil unit 200 of the present disclosure is provided at the lower portion of the body 100. Further, when the power is applied to the electromagnet 300, the body 100 is levitated, and the body 100 is capable of being rotated by a wind force.

At this time, the levitation coil 210 of the coil unit 200 is provided such that the vertical gap is formed between the levitation coil 210 and the electromagnet 300, and levitates the body 100 in the vertical direction. Further, the electric coil 220 is provided such that the horizontal gap is formed between the electric coil 220 and the electromagnet 300, so that the body 100 can be rotated.

Here, the electromagnet 300 may be supported by being provided at the support member 350.

At this time, when a problem occurs on the electric coil 220 and the electromagnet 300, a damage due to collision between the body 100 and the support member 350 and a dangerous situation may occur.

Here, since the gap sensor 400 is provided at the support member 350, the gap sensor 400 measures the gap between the coil unit 200 and the electromagnet 300, and the gap sensor 400 may be connected to the controller (not illustrated).

At this time, the gap sensor 400 senses whether the gap between the levitation coil 210 and the electromagnet 300 is reduced, and the controller (not illustrated) may stop the operation of the electromagnet 300.

In addition, the buffer members 150 are provided at the lower portion of the body 100. Therefore, a collision between the body 100 and the support member 350, the collision occurring when a problem occurs in the levitation coil 210 and the electromagnet 300 and the gap is reduced, may be prevented.

The present disclosure is not limited to the embodiments described above, and may be variously applied. In addition, the present disclosure may be variously modified by those skilled in the art to which the present disclosure pertains without departing from the spirit of the present disclosure claimed in the claims.

What is claimed is:

1. A magnetic levitation rotor sail, the rotor sail comprising:
    a body;
    a coil unit provided at a lower portion of the body;
    an electromagnet configured to levitate the coil unit;
    a support member supporting the electromagnet;
    a gap sensor provided at the support member and configured to measure a gap between the coil unit and the electromagnet;
    a locking member configured to fix the body to a hull; and
    a buffer member provided at the lower portion of the body and configured to prevent a collision between the coil unit and the support member,
    wherein the coil unit comprises:
        a levitation coil disposed above the electromagnet and configured to vertically lift the body through repulsion by the electromagnet and form a vertical gap between the electromagnet and the levitation coil; and
        an electric coil horizontally disposed relative to the electromagnet and configured to horizontally rotate the body through repulsion by the electromagnet and form a horizontal gap between the electromagnet and the electric coil.

2. The magnetic levitation rotor sail of claim 1, wherein the levitation coil has the same polarity as that of the electromagnet to cause the levitation coil to levitate the body by using repulsive force.

3. The magnetic levitation rotor sail of claim 1, wherein the electric coil comprises N poles and S poles and the electromagnet comprises N poles and S poles, and wherein the electric coil is configured to rotate by the N poles and the S poles of the electric coil pushing the N poles and the S poles of the electromagnet.

4. The magnetic levitation rotor sail of claim 1, wherein the electromagnet is configured to stop an operation thereof in response to the gap between the levitation coil and the electromagnet being reduced.

5. The magnetic levitation rotor sail of claim 1, wherein the levitation coil is disposed to be perpendicular to the electromagnet.

6. The magnetic levitation rotor sail of claim 1, wherein the levitation coil is disposed to be parallel with the electromagnet.

* * * * *